US009514887B2

(12) United States Patent
Okamoto et al.

(10) Patent No.: US 9,514,887 B2
(45) Date of Patent: Dec. 6, 2016

(54) ALUMINUM FOIL WITH CARBONACEOUS PARTICLES DISPERSED AND SUPPORTED THEREIN

(75) Inventors: Atsushi Okamoto, Osaka (JP); Hiroyuki Hoshi, Osaka (JP); Setsuo Andou, Kagoshima (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 13/508,397

(22) PCT Filed: Nov. 11, 2010

(86) PCT No.: PCT/JP2010/070099
§ 371 (c)(1),
(2), (4) Date: Jun. 12, 2012

(87) PCT Pub. No.: WO2011/059023
PCT Pub. Date: May 19, 2011

(65) Prior Publication Data
US 2012/0251879 A1 Oct. 4, 2012

(30) Foreign Application Priority Data
Nov. 11, 2009 (JP) ................................. 2009-257756

(51) Int. Cl.
*H01G 9/008* (2006.01)
*C25D 1/04* (2006.01)
(Continued)

(52) U.S. Cl.
CPC ............... *H01G 9/016* (2013.01); *C25D 1/04* (2013.01); *C25D 3/44* (2013.01); *C25D 7/0614* (2013.01);
(Continued)

(58) Field of Classification Search
CPC ............ C25D 1/04; C25D 15/00; C25D 7/06; C25D 5/18; C25D 3/44; C25D 7/0164; H01G 9/016; H01G 9/04; H01G 11/68; H01M 4/13; H01M 4/661; H01M 4/665; H01M 4/666; H01M 4/662; H01M 10/0525; Y02E 60/122; Y02E 60/13; Y02T 10/7011; Y02T 10/7022
(Continued)

(56) References Cited

U.S. PATENT DOCUMENTS 5,041,194 A * 8/1991 Mori ...................... C25D 3/665
205/237
2007/0084731 A1* 4/2007 Ware ............................ 205/255
(Continued)

FOREIGN PATENT DOCUMENTS

CN 101258269 A 9/2008
JP 08-236120 9/1996
(Continued)

OTHER PUBLICATIONS
Machine Translation JP 2007-070689.*
(Continued)

*Primary Examiner* — Nicholas P D'Aniello
*Assistant Examiner* — Stephen Yanchuk
(74) *Attorney, Agent, or Firm* — Kratz, Quintos & Hanson, LLP

(57) ABSTRACT

An object of the present invention is to provide an aluminum foil that can make a positive electrode current collector thinner for size reduction and higher energy density of electrical storage devices, be produced easily and has a low surface resistance. An aluminum foil of the present invention as a means for achieving the object is characterized in that carbonaceous particles are dispersed and supported therein. The aluminum foil with carbonaceous particles dispersed and supported therein of the present invention can be produced by electrolysis.

5 Claims, 5 Drawing Sheets

(51) Int. Cl.
  C25D 3/44    (2006.01)
  C25D 7/06    (2006.01)
  H01G 9/04    (2006.01)
  H01G 11/68   (2013.01)
  H01M 4/13    (2010.01)
  H01M 4/66    (2006.01)
  C25D 15/00   (2006.01)
  H01M 10/0525 (2010.01)

(52) U.S. Cl.
  CPC ............. *C25D 15/00* (2013.01); *H01G 9/04* (2013.01); *H01G 11/68* (2013.01); *H01M 4/13* (2013.01); *H01M 4/661* (2013.01); *H01M 4/665* (2013.01); *H01M 4/666* (2013.01); *H01M 4/663* (2013.01); *H01M 10/0525* (2013.01); *Y02E 60/122* (2013.01); *Y02E 60/13* (2013.01); *Y02P 70/54* (2015.11); *Y02T 10/7011* (2013.01); *Y02T 10/7022* (2013.01); *Y10T 428/12431* (2015.01)

(58) Field of Classification Search
  USPC ......................... 205/80, 233, 237; 29/623.5
  See application file for complete search history.

(56) References Cited

U.S. PATENT DOCUMENTS

2007/0178379 A1* 8/2007 Tamura et al. ............... 429/200
2009/0277793 A1* 11/2009 Ehira et al. .................... 205/50

FOREIGN PATENT DOCUMENTS

| | | | |
|---|---|---|---|
| JP | 08-298137 | | 11/1996 |
| JP | 11-97032 | | 4/1999 |
| JP | H11-288849 | A | 10/1999 |
| JP | 2003-243267 | A1 | 8/2003 |
| JP | 2003-249223 | A1 | 9/2003 |
| JP | 2005-048206 | * | 2/2005 |
| JP | 2005-129264 | | 5/2005 |
| JP | 2006-086058 | A | 3/2006 |
| JP | 2007-70689 | A1 | 3/2007 |
| JP | 2007-162080 | A1 | 6/2007 |
| JP | 2007-291490 | * | 11/2007 |
| KR | 10-2008-0095993 | A | 10/2008 |
| WO | 2007/029395 | A1 | 3/2007 |

OTHER PUBLICATIONS

Machine Translation JP 2007-291490.*
STIC Search.*
Machine Translation: Okamoto et al 2007-291490.*
Machine Translation: Tan et al JP 2005-048206.*
International Search Report for International Application No. PCT/JP2010/070099 dated Feb. 15, 2011.
Japanese Office Action dated Dec. 24, 2013 issued in counterpart application No. 2011-540535.
Chinese Office Action dated Aug. 11, 2014 issued by the State Intellectual Property Office of the People's Republic of China in counterpart application No. 201080057838.4.
Extended European search report issued on Dec. 8, 2015 to the corresponding European patent application No. 10829982.7.

* cited by examiner

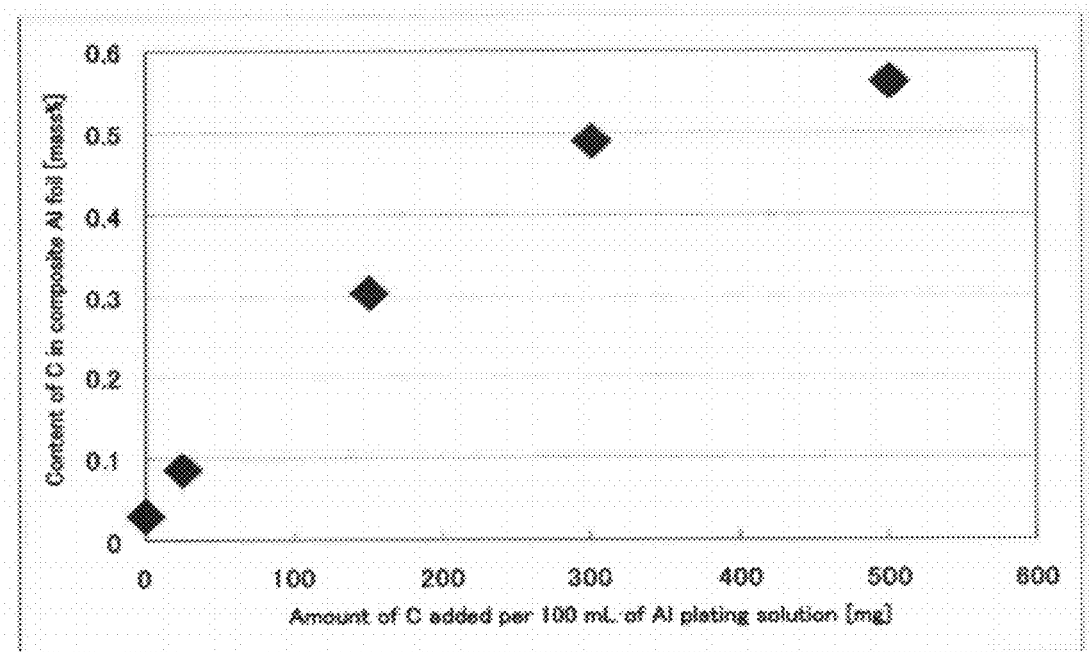

ALUMINUM FOIL WITH CARBONACEOUS PARTICLES DISPERSED AND SUPPORTED THEREIN

TECHNICAL FIELD

The present invention relates to an aluminum foil with carbonaceous particles dispersed and supported therein, which is usable, for example, as a positive electrode current collector for electrical storage devices such as lithium-ion secondary batteries and super capacitors (electrical double-layer capacitors, redox capacitors, lithium-ion capacitors, etc.).

BACKGROUND ART

It is a well known fact that lithium-ion secondary batteries, which have high energy density and show no significant decrease in discharge capacity, have been used for a power source of mobile tools, such as mobile phones and laptop computers. In recent years, with mobile tools becoming smaller, there is a need for smaller lithium-ion secondary batteries for use therein. Further, with the development of hybrid cars, solar power generation, and other technologies from the viewpoint of preventing global warming, etc., the application of super capacitors having high energy density, such as electrical double-layer capacitors, redox capacitors, and lithium ion capacitors, has been expanding at an accelerated pace, and there is a need for a further increase in energy density.

An electrical storage device, such as a lithium-ion secondary battery or a super capacitor, is configured, for example, such that a positive electrode, a negative electrode, and a separator made of polyolefine or the like between them are arranged in an organic electrolytic solution containing as an electrolyte a fluorine-containing compound, such as $LiPF_6$ or $NR_4.BF_4$ (R is an alkyl group). The positive electrode includes a positive electrode active material, such as $LiCoO_2$ (lithium cobalt oxide) or active carbon, and a positive electrode current collector, while the negative electrode includes a negative electrode active material, such as graphite or active carbon, and a negative electrode current collector. With respect to their shape, generally, a current collector having applied thereon an active material is formed into a sheet. The electrodes are each subjected to a large voltage and also immersed in a highly corrosive organic electrolytic solution that contains a fluorine-containing compound. Accordingly, materials for a positive electrode current collector, in particular, are required to have excellent electrical conductivity together with excellent corrosion resistance. Under such circumstances, currently, nearly 100% of the time, the material for a positive electrode current collector is aluminum, which is a good electrical conductor and also forms a passive film on the surface to offer excellent corrosion resistance (as materials for a negative electrode current collector, copper, nickel, and the like can be mentioned). An aluminum foil having a thickness of about 15 to 20 μm that is produced by rolling, generally, is used as a positive electrode current collector.

However, while the passive film that is formed on the surface of an aluminum foil contributes to suppress the corrosion of the positive electrode current collector, there is such a problem that the film blocks electrical conductivity between the positive electrode current collector and the positive electrode active material and brings about the increase in internal resistance of an electrical storage device caused by the increase in the surface resistance (interface resistance) of the positive electrode current collector. This problem causes heat generation or lowering of charge/discharge efficiency of the electrical storage device, and, as the result, is an obstacle to higher energy density of the electrical storage device.

As a helpful technology for solving the above-mentioned problem, for example, Patent Document 1 discloses an electrode member for solid electrolytic capacitor, which is produced by a process comprising the steps of adhering a carbon-containing material to the surface of aluminum, and heating the aluminum with which a carbon-containing material has been adhered to the surface thereof in a state of being arranged in a space containing a hydrocarbon-containing material, and has a carbon-containing layer formed on the surface of aluminum via an interstitial layer containing an aluminum element and a carbon element. Patent Document 2 discloses an electrode for nonaqueous electrolyte battery that is provided with a current collector including an aluminum foil or an aluminum alloy foil, and an active material-containing layer that is formed on the surface of the current collector and comprises an active material, an electrical conductive agent containing a carbon particle group, and a binding agent. These technologies can be rated as a method for reducing the surface resistance of an aluminum foil, however, there is such a problem that the production process becomes complex, in order to provide another layer on the surface of an aluminum foil. Further, there is also such a problem in a method of forming another layer on the surface of an aluminum foil that it cannot achieve the thickness reduction of a positive electrode current collector for size reduction or higher energy density of electrical storage devices.

PRIOR ART DOCUMENTS

Patent Documents

Patent Document 1: JP-A-2006-100478
Patent Document 2: JP-A-2009-38017

SUMMARY OF THE INVENTION

Problems that the Invention is to Solve

Thus, an object of the present invention is to provide an aluminum foil that can make a positive electrode current collector thinner for size reduction and higher energy density of electrical storage devices, be produced easily and has a low surface resistance.

Means for Solving the Problems

The present inventors have been intensively studying the aluminum electroplating technology. The production of aluminum foils by electrolysis is expected as a method for replacing the production of aluminum foils by rolling that has limitations on film thinning in an industrial scale. Thus, the present inventors studied hard to find that the above-mentioned purpose can be achieved by making carbonaceous particles be dispersed and supported in an aluminum foil using electrolysis, differing from technologies that are disclosed in Patent Documents 1 and 2 in which another layer is provided on the surface of an aluminum foil.

An aluminum foil of the present invention accomplished based on the above findings is, according to a first version, characterized in that carbonaceous particles are dispersed and supported therein.

An aluminum foil according to a second version is characterized in that in the aluminum foil according to the first version, at least a part of the carbonaceous particles are exposed to the outside.

An aluminum foil according to a third version is characterized in that in the aluminum foil according to the first version, the carbonaceous particles have a size of 1 nm to 100 μm.

An aluminum foil according to a fourth version is characterized in that in the aluminum foil according to the first version, the aluminum foil itself has a thickness of 1 to 150 μm.

An aluminum foil according to a fifth version is characterized in that in the aluminum foil according to the first version, the aluminum foil itself has an aluminum content of 97.0 to 99.9 mass % and S and Cl contents of 1.5 mass % or less each.

An aluminum foil according to a sixth version is characterized in that in the aluminum foil according to the first version, the amount of carbonaceous particles dispersed and supported is 0.01 to 3.0 mass % of the aluminum foil with the carbonaceous particles dispersed and supported therein.

A method for producing an aluminum foil with carbonaceous particles dispersed and supported therein of the present invention, according to a seventh version, is characterized by forming an aluminum film with carbonaceous particles dispersed and supported therein on the surface of a substrate by electrolysis using a plating liquid containing carbonaceous particles dispersed therein, and, after that, removing the film from the substrate.

A production method according to an eighth version is, in the production method according to the seventh version, characterized by using a plating liquid obtained by dispersing carbonaceous particles in a plating solution comprising at least (1) a dialkyl sulfone, (2) an aluminum halide, and (3) at least one nitrogen-containing compound selected from the group consisting of ammonium halides, hydrogen halide salts of primary amines, hydrogen halide salts of secondary amines, hydrogen halide salts of tertiary amines, and quaternary ammonium salts represented by the general formula: $R^1R^2R^3R^4N.X$ ($R^1$ to $R^4$ independently represent an alkyl group and X represents a counteranion for the quaternary ammonium cation).

A production method according to a ninth version is, in the production method according to the seventh version, characterized by applying a current density of 2 A/dm² or more as an electroplating condition.

A positive electrode current collector for electrical storage devices of the present invention is, according to a tenth version, characterized by comprising the aluminum foil according to the first version.

An electrode for electrical storage devices of the present invention is, according to an eleventh version, characterized by comprising an electrode active material supported on the aluminum foil according to the first version.

An electrical storage device of the present invention is, according to a twelfth version, characterized by being configured using the electrode for electrical storage devices according to the eleventh version.

Effect of the Invention

The present invention enables the provision of an aluminum foil that can make a positive electrode current collector thinner for size reduction and higher energy density of electrical storage devices, be produced easily and has a low surface resistance.

BRIEF DESCRIPTION OF THE DRAWINGS

FIG. 9 is a graph showing the relation between the amount of acetylene black particles added to a plating solution and the amount of the acetylene black particles dispersed and supported in an aluminum foil with acetylene black particles dispersed and supported therein in Reference Example 1.

MODE FOR CARRYING OUT THE INVENTION

Figure 1:
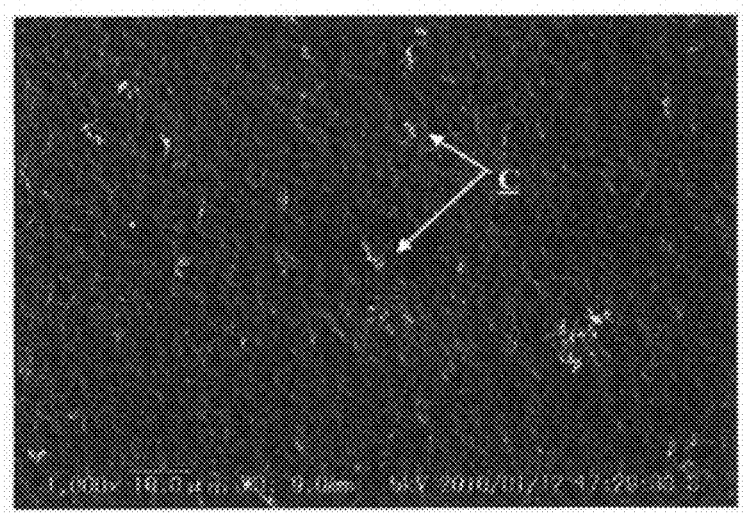
FIG. 1 is a surface photograph of an aluminum foil with acetylene black particles dispersed and supported therein, obtained in Example 1.

An aluminum foil of the present invention is characterized in that carbonaceous particles are dispersed and supported therein.

Carbonaceous particles to be dispersed and supported in an aluminum foil are preferably particles having a carbon content of 90 mass % or more to offer an excellent electrical conductivity, and examples thereof include furnace black particles, acetylene black particles, carbon black particles, black lead particles, graphite particles and, in addition, carbon nano tubes and carbon nano fibers, and the like. The size of carbonaceous particles (it means a particle diameter, a diameter, a diameter or length of a fiber, or the like depending on the shape thereof, and, when particles lie in an aggregated state, it may mean the size thereof) is preferably 1 nm to 100 μm, more preferably 1 nm to 15 μm, and furthermore preferably 3 nm to 5 μm. A too small size of a carbonaceous particle may be liable not to contribute to the reduction of surface resistance of the aluminum foil, while a too large size may cause difficulty of homogeneous dispersion in an aluminum foil or a plating solution and, in addition, impracticability of achieving the thickness reduction of a positive electrode current collector. In order to give a high strength to an aluminum foil with carbonaceous particles dispersed and supported therein, the size of carbonaceous particles is preferably 50% or less of the thickness of the aluminum foil. No particular limitation is imposed on an existence form of carbonaceous particles dispersed and supported in an aluminum foil, but, in order to make carbonaceous particles contribute effectively to the reduction of surface resistance of the aluminum foil, preferably at least a part of the carbonaceous particles protrude from the surface of the foil and are exposed to the outside. In view of this point, the size of carbonaceous particles may be larger than the thickness of the aluminum foil, but, in this case, in order that carbonaceous particles may be supported strongly by the aluminum foil, the size thereof is preferably 150% or less of the thickness of the aluminum foil.

The amount of carbonaceous particles dispersed and supported in an aluminum foil with the carbonaceous particles dispersed and supported therein is preferably 0.01 to 3.0 mass % of the aluminum foil with the carbonaceous particles dispersed and supported therein. A too small amount dispersed and supported may be liable not to contribute to the reduction of surface resistance of the aluminum foil, while a too large amount may give an adverse effect on the strength of the aluminum foil.

The aluminum foil with carbonaceous particles dispersed and supported therein of the present invention can be produced by electrolysis. The production of a metal foil by electrolysis is, for example, performed by forming a metal film on the surface of a substrate such as a stainless steel plate by an electroplating and, after that, removing the film from the substrate, which is well known as a method for producing, for example, a copper foil. Since aluminum is a base metal electrochemically, however, electroplating is very difficult. Therefore, it is not easy to produce an aluminum foil by electrolysis. However, this problem has already been solved primarily by use of the plating solution that was found by studies of the present inventors until now. Accordingly, in order to produce the aluminum foil with carbonaceous particles dispersed and supported therein of the present invention, it is sufficient to disperse carbonaceous particles in such a plating solution and to perform electroplating. Plating liquids suitable for producing the aluminum foil with carbonaceous particles dispersed and supported therein of the present invention includes, for example, a plating liquid that is obtained by dispersing carbonaceous particles in a plating solution comprising at least (1) a dialkyl sulfone (2) an aluminum halide, and (3) at least one nitrogen-containing compound selected from the group consisting of ammonium halides, hydrogen halide salts of primary amines, hydrogen halide salts of secondary amines, hydrogen halide salts of tertiary amines, and quaternary ammonium salts represented by the general formula: $R^1R^2R^3R^4N.X$ ($R^1$ to $R^4$ independently represent an alkyl group and X represents a counteranion for the quaternary ammonium cation), which can perform a stable plating treatment even when an applied current density is 10 A/dm$^2$ or more, and, therefore, can improve a film formation rate, and which can produce a high-ductility, high-purity aluminum foil. This plating liquid has such advantages that it has a low chlorine concentration not to induce such a problem as corrosion of facilities due to the generation of hydrogen chloride gas, and that it requires no addition of such an organic solvent as benzene or toluene in order to increase the film formation rate to allow washing with water and a waste liquid treatment to be performed easily.

Examples of dialkyl sulfones to be contained in the plating liquid include those having a $C_{1-6}$ alkyl group (straight or branched), such as dimethylsulfone, diethylsulfone, dipropylsulfone, dihexylsulfone, methylethylsulfone. In terms of excellent electrical conductivity and availability, and the like, it is preferable to use dimethylsulfone.

Examples of aluminum halides include aluminum chloride and aluminum bromide. In terms of minimizing the moisture content of the plating liquid, which causes the inhibition of the deposition of aluminum, it is preferable to use an anhydride as the aluminum halide.

Examples of ammonium halides usable as the nitrogen-containing compound include ammonium chloride and ammonium bromide. Further, examples of primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of hydrogen halides include hydrogen chloride and hydrogen bromide. Examples of alkyl groups represented by $R^1$ to $R^4$ in a quaternary ammonium salt represented by the general formula: $R^1R^2R^3R^4N.X$ ($R^1$ to $R^4$ independently represent an alkyl group and X represents a counteranion for the quaternary ammonium cation) include $C_{1-6}$ alkyl groups (straight or branched), such as a methyl group, an ethyl group, a propyl group, and a hexyl group. X may be a halide ion such as a chlorine ion, a bromine ion, or an iodine ion, or may alternatively be $BF_4^-$, $PF_6^-$, or the like, for example. Specific examples of such compounds include tetramethylammonium chloride, tetramethylammonium bromide, tetraethylammonium iodide, and tetraethylammonium tetrafluoroborate. In terms of facilitating the production of a high-ductility, high-purity aluminum foil at a high film formation rate, preferred examples of nitrogen-containing compounds include hydrochlorides of tertiary amines, such as trimethylamine hydrochloride.

The dialkyl sulfone, aluminum halide, and nitrogen containing compound are added in the following proportions, for example. Per 10 mol of dialkyl sulfone, the amount of aluminum halide is preferably 1.5 to 4.0 mol and more preferably 2.0 to 3.5 mol. The amount of nitrogen-containing compound is preferably 0.01 to 2.0 mol and more preferably 0.05 to 1.5 mol. When the amount of aluminum halide added is less than 1.5 mol per 10 mol of dialkyl sulfone, this may cause the darkening of the formed aluminum film (a phenomenon called burning) or may reduce the film formation efficiency. Meanwhile, when it is more than 4.0 mol, the liquid resistance of the plating liquid may become too high, whereby the plating liquid is heated and decomposes. Further, when the amount of nitrogen-containing compound added is less than 0.01 mol per 10 mol of dialkyl sulfone, the addition is less likely to achieve its effects, that is, effects such as the improvement of the film formation rate owing to the achievement of plating at a high applied current density based on the improved electrical conductivity of the plating liquid, the purity increase or ductility improvement in the aluminum foil, etc. Meanwhile, when it is more than 2.0 mol, because of an essential change in the composition of the plating liquid, no aluminum may be deposited.

The amount of carbonaceous particles dispersed in the plating liquid is preferably $1 \times 10^{-4}$ to 1 g per 100 mL of the plating liquid. A too small amount dispersed may not enable carbonaceous particles to be dispersed and supported in an amount sufficient to contribute to reduce the surface resistance of the aluminum foil, while a too large amount dispersed may make the viscosity of the plating liquid too high to make the electroplating difficult. The dispersion of carbonaceous particles in a plating solution is preferably performed with sufficient stirring so that carbonaceous particles are dispersed homogeneously in the solution and they are to be dispersed and supported homogeneously in an aluminum foil. If necessary, ultrasonic waves may be given. Incidentally, the above-mentioned plating solution, which has been found according to studies of the present inventors until now, has such an advantage that it offers extremely excellent dispersibility of carbonaceous particles even when no dispersant is added to the plating liquid or no surface treatment is given to carbonaceous particles in order to enhance the dispersibility of carbonaceous particles in the plating liquid.

The electroplating conditions may be, for example, conditions where the temperature of the plating liquid is 80 to 110° C. and the applied current density is 2 to 15 A/dm$^2$. The lower limit of the plating liquid temperature is to be determined in consideration of the melting point of the plating liquid, and is preferably 85° C., and more preferably 95° C. (when the temperature is below the melting point of the plating liquid, the plating liquid solidifies, and plating cannot be performed anymore). Meanwhile, when the plating liquid temperature is more than 110° C., this may accelerate the reaction between the aluminum film formed on the surface of the substrate and the plating liquid, whereby more impurities are incorporated into the aluminum film, resulting in reduced purity. Further, when the applied current density is less than 2 A/dm$^2$, the film formation efficiency may decrease to make it difficult to produce an aluminum foil with a sufficient amount of carbonaceous particles dispersed and supported therein, while when it is more than 15 A/dm$^2$, because of the decomposition of the nitrogen-containing compound, etc., it may be impossible to stably perform plating or obtain a high-ductility, high-purity aluminum foil. The applied current density is preferably 3 to 12 A/dm$^2$. Incidentally, the plating time depends on the desired thickness of the aluminum foil, the temperature of the plating liquid, the applied current density, and the like, and is usually 1 to 90 minutes (in consideration of the production efficiency, it is preferably 1 to 30 minutes). In terms of preventing the degradation of the plating liquid to extend the life, it is preferable that the plating environment is a dry atmosphere.

The substrate (cathode) for forming an aluminum film may be, for example, a stainless steel plate, a titanium plate, an aluminum plate, a nickel plate, or the like. In order to facilitate the removal of an aluminum film from a substrate, it is desired that the substrate has as smooth a surface as possible, such as a mirror-finished surface. Incidentally, as a material for the anode, aluminum can be mentioned, for example. The aluminum film can be removed from the substrate batchwise. Alternatively, it is also possible to perform the formation and removal of an aluminum film continuously using a cathode drum (e.g., JP-A-6-93490). Incidentally, prior to remove the aluminum film from the substrate, it is preferable to perform washing with water for eliminating the plating liquid adhering to the surface of the substrate with which the aluminum film is formed on the surface thereof and then drying. Further, after removing the aluminum film from the substrate to obtain an aluminum foil, it is preferable to subject the aluminum foil to a heat treatment. When washing with water is performed to eliminate the plating liquid adhering to the surface, moisture is eliminated by subsequent drying. But, if the moisture is not sufficiently eliminated but remains, and carbonaceous particles protruding from the surface of the foil or lying near the surface absorb the moisture, this may adversely effect on characteristics of electrical storage devices when the foil is used as a positive electrode current collector of electrical storage devices (instability of electrochemical behaviors, etc.). The heat treatment for the aluminum foil aims at preventing occurring of such a problem, and may be performed for 2 to 120 minutes at 80 to 550° C. under such an atmosphere as an air atmosphere, a reduced-pressure atmosphere and an inert gas atmosphere using argon gas or nitrogen gas. A heat treatment temperature less than 80° C. may not exert sufficient effect of performing the heat treatment, while a heat treatment temperature more than 550° C. may cause the softening of the aluminum foil because the foil approaches the melting point of aluminum (660° C.). A heat treatment time less than 2 minutes may not exert sufficient effect of performing the heat treatment, while a heat treatment time more than 120 minutes may adversely affect the productivity. In view of the above, the heat treatment temperature is preferably 100 to 450° C., and more preferably 200 to 350° C. The heat treatment time is preferably 20 to 90 minutes. Incidentally, the heat treatment for the aluminum foil also has an effect of eliminating strain that may reside in the foil. Further, the aluminum foil that is obtained by electrolysis using the above-mentioned plating solution having been found through studies of the present inventors until now has such an advantage that strength against tensile force is improved by being subjected to the heat treatment.

According to the above method, an aluminum foil having a thickness of 15 μm or less, which has been extremely difficult to produce by rolling, and also an aluminum foil having a thickness of 10 μm or less, which, without exaggeration, has been almost impossible to produce by rolling, can be produced at a high film formation rate by electrolysis. In addition, the obtained aluminum foil is highly ductile and also highly pure. Specifically, for example, an aluminum foil having an aluminum content of 97.0 to 99.9 mass %, S and Cl contents of 1.5 mass % or less each (normally 0.01 to 0.5 mass %), and a thickness of 1 to 15 μm (a small amount of inevitable C or O from the air may also be contained) can be easily produced. The thickness of the aluminum foil is preferably 1 to 150 μm. A too thin thickness may not sufficiently function as a positive electrode current collector, while a too thick thickness may make it impossible to achieve the thickness reduction of a positive electrode current collector. Incidentally, in the above, the thickness of an aluminum foil means the thickness of the aluminum foil itself, and the purity of an aluminum foil means the purity of the aluminum foil itself.

Incidentally, the plating liquid usable for producing the aluminum foil with carbonaceous particles dispersed and supported therein of the present invention is not limited to the above-mentioned plating liquid. Such plating liquids are also usable that are obtained by dispersing carbonaceous particles in plating solutions, for example, capable of forming stably an aluminum film under an electroplating condition of applied current density of 2 A/dm$^2$ or more, specifically the plating solution containing dimethylsulfone, an aluminum halide, and dimethylamineborane or a derivative thereof or a decomposition product of dimethylamineborane as described in JP-A-2006-161154, the plating solution containing dimethylsulfone, an aluminum halide, and an organic compound having a 2,2'-bipyridyl structure as a basic skeleton or a derivative thereof as described in JP-A-2007-291490, and the plating solution that is prepared by dissolving an aluminum halide in dialkyl sulfone as described in JP-A-2008-31551.

EXAMPLES

Hereinafter, the present invention will be described in detail with reference to the examples, but the following descriptions are not to be construed as restrictive.

Example 1

(Production of Aluminum Foil with Acetylene Black Particles Dispersed and Supported Therein)

Figure 2:
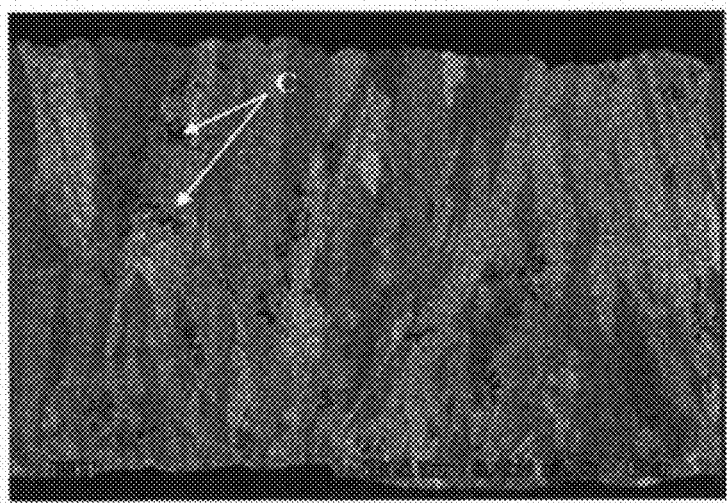
FIG. 2 is a cross-sectional photograph of the foil.

Dimethyl sulfone, anhydrous aluminum chloride, and trimethylamine hydrochloride were mixed in a molar ratio of 10:3:0.1 and dissolved at 110° C. to give an electrolytic aluminum plating solution. To 200 mL of the plating solution, 0.1 g of commercially available acetylene black particle aggregates (carbon content: 98 mass % or more) having a size of about 1 µm was added, which was stirred sufficiently to give a plating liquid with acetylene black homogeneously dispersed therein. Using an aluminum plate with a purity of 99.99 mass % as the anode and a titanium plate as the cathode (substrate for forming an aluminum film), electroplating was performed at an applied current density of 5 A/dm$^2$ for 15 minutes with stirring the plating liquid at a stirring rate of 300 rpm while maintaining the plating liquid at 100° C. Fifteen minutes later, the titanium plate having an aluminum film formed on the surface thereof was picked up from the plating liquid, washed with water, and then dried. Subsequently, from the end portion thereof, forceps were inserted between the aluminum film and the titanium plate and moved to slide along the titanium plate. As a result, the aluminum film was removed from the titanium plate, and an aluminum foil was thus obtained. The aluminum foil thus obtained was observed under a scanning electron microscope (S-4300: manufactured by Hitachi, Ltd.). Innumerable acetylene black particles were interspersed at the surface of the foil, and a part thereof were supported in a state of being exposed to the outside by protruding from the surface of the foil, etc. (FIG. 1). The cross-sectional configuration of the foil was such that crystalline structure grew while increasing in width from the surface located on the substrate side toward the surface opposite thereof (broadening toward the end) and acetylene black particles were dispersed and supported randomly in crystal grains and grain boundaries (FIG. 2: the upside is the plating side and the downside is the substrate-contacting side). The obtained aluminum foil had a thickness (thickness of the aluminum foil itself) of 15 µm and high purity (purity of the aluminum foil itself) (aluminum content: 99.6 mass %, S and Cl contents: 0.2 mass % or less each). In addition, similarly to an aluminum foil produced by rolling, the aluminum foil was highly ductile. The amount of acetylene black particles dispersed and supported was 0.15 mass % of the aluminum foil with acetylene black particles dispersed and supported therein. Incidentally, the thickness of the aluminum foil was measured by observing the cross section under a scanning electron microscope (S-800: manufactured by Hitachi, Ltd.) (the same applies hereinafter). The purity of the aluminum foil was measured as follows. After washing both sides of the aluminum foil with water, the S content was measured using a carbon/sulfur analyzer (EMIA-820W: manufactured by HORIBA, Ltd.), while the Cl content was measured using a wavelength-dispersive X-ray fluorescence spectrometer (RIX-2100: manufactured by Rigaku Corporation), and the remainder was defined as the aluminum content (the same applies hereinafter). The amount of acetylene black particles dispersed and supported was measured using a carbon/sulfur analyzer (EMIA-820W: manufactured by HORIBA, Ltd,) (the same applies hereinafter).

(Effect of Heat Treatment on Aluminum Foil with Acetylene Black Particles Dispersed and Supported Therein)

Figure 3:
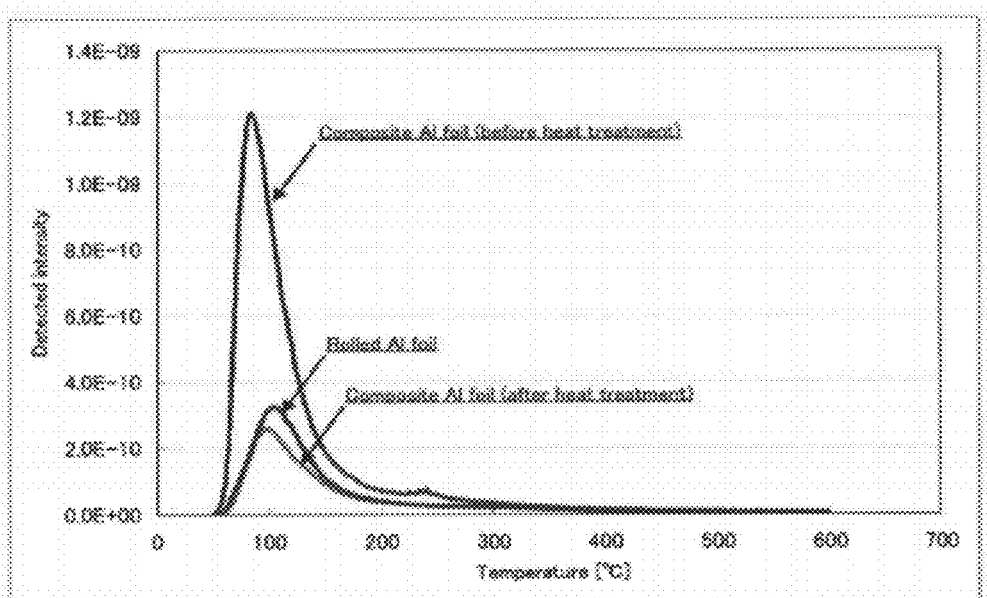
FIG. 3 is a chart showing an effect of a heat treatment of the aluminum foil with acetylene black particles dispersed and supported therein on the reduction of moisture content of the foil in Example 1.
Figure 4:
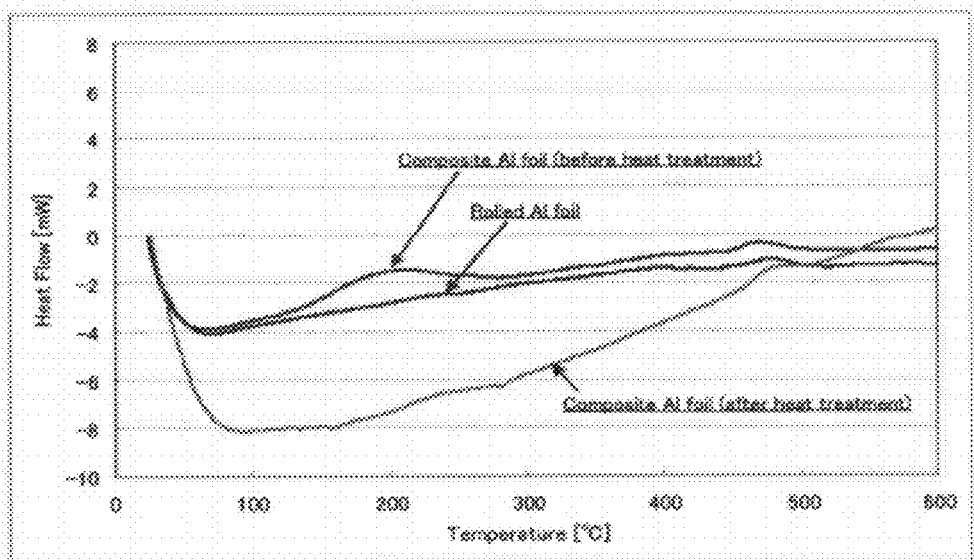
FIG. 4 is a chart showing an effect on the elimination of strain of the foil.

The aluminum foil with acetylene black particles dispersed and supported therein, which was obtained according to the above process, was subjected to a heat treatment for 60 minutes at 300° C. under an air atmosphere. Moisture contents of the foil before the heat treatment and the foil after the heat treatment were measured using a thermal desorption gas spectrometer (EMD-WA1000S: manufactured by ESCO, Ltd.). Results are shown in FIG. 3 (in the drawing, "Composite Al foil (before heat treatment/after heat treatment)"). Incidentally, FIG. 3 also shows the result of measuring moisture content of a commercially available aluminum foil that is produced by rolling and has a thickness of 20 µm (manufactured by Nippon Foil Mfg. Co., Ltd., hereinafter abbreviated as "commercially available rolled foil") (in the drawing, "Rolled Al foil"). As is clear from FIG. 3, the moisture content of the foil before the heat treatment (81.5 ppm) was much more than the moisture content of the commercially available rolled foil, but, since the moisture adhering to the surface of the foil was eliminated by performing the heat treatment, the moisture content of the foil after the heat treatment (25.5 ppm) was approximately equal to the moisture content of the commercially available rolled foil. Further, a differential scanning calorimetry was performed for the foil before the heat treatment and the foil after the heat treatment using DSC 8236 manufactured by Rigaku Corporation. Results are shown in FIG. 4 (in the drawing, "Composite Al foil (before heat treatment/after heat treatment)"). Incidentally, FIG. 4 also shows the result of a differential scanning calorimetry that was performed for the commercially available rolled foil (in the drawing, "Rolled Al foil"). As is clear from FIG. 4, an exothermic peak caused by strain residing in the foil was observed near 200° C. for the foil before the heat treatment, but, since the strain was eliminated by performing the heat treatment, almost no corresponding exothermic peak was observed for the foil after the heat treatment. Further, in order to evaluate the strengths of the foil before the heat treatment and the foil after the heat treatment against tensile force, respective tensile strengths were measured using an accurate universal testing machine (EZTest: manufactured by Shimadzu Corporation). The tensile strength of the foil before the heat treatment was 200 N/mm$^2$, but the tensile strength of the foil after the heat treatment was 250 N/mm$^2$. Thus, the heat treatment improved the strength of the foil. When such a fact is considered that, usually, a heat treatment in the vicinity of 300° C. lowers the strength of a metal foil caused by an annealing effect, this result was unexpected. The reason of the improvement in the strength of the foil by a heat treatment was not necessarily clear, but it was guessed that the above-mentioned unique cross-sectional configuration of the foil might participate.

(Applicability of Aluminum Foil with Acetylene Black Particles Dispersed and Supported Therein as Positive Electrode Current Collector for Electrical Storage Devices)

Figure 5:
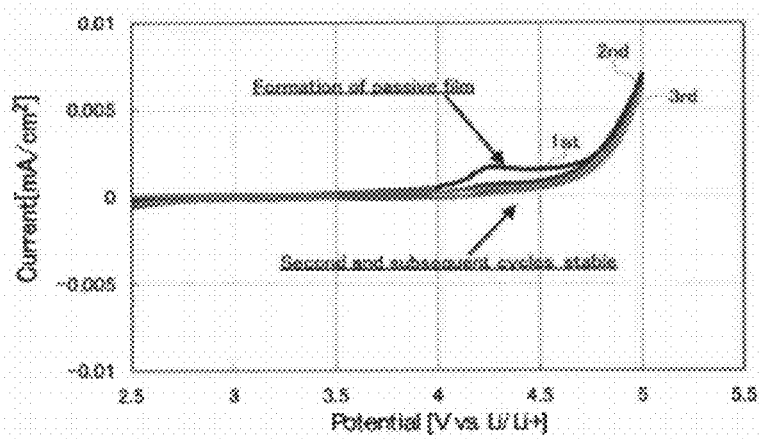
FIG. 5 is a cyclic voltammogram for the case where the aluminum foil with acetylene black particles dispersed and supported therein obtained in Example 1 is used as a test electrode.
Figure 6:
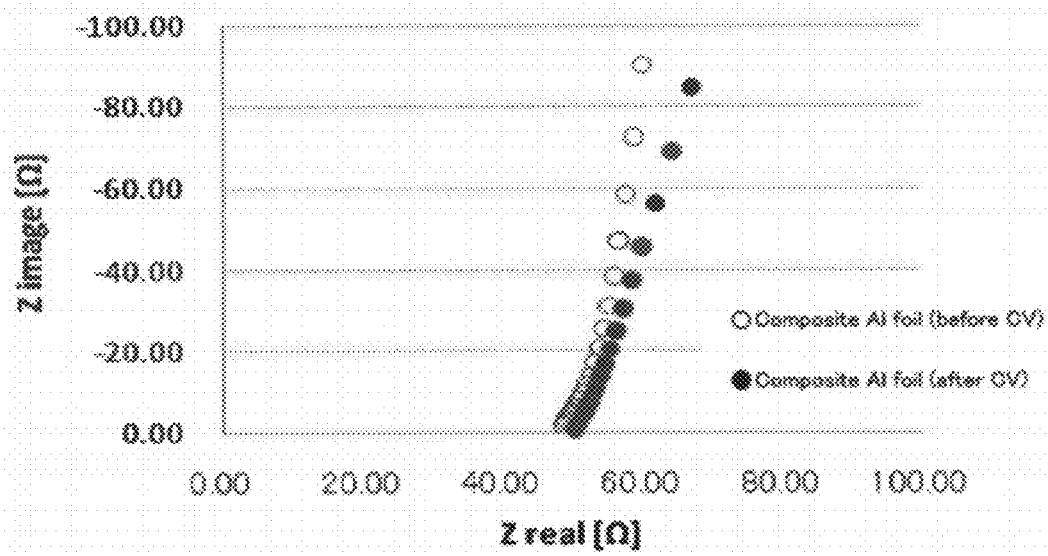
FIG. 6 is a graph showing inter-terminal resistances of a cell before and after performing the cyclic voltammetry.
Figure 7:
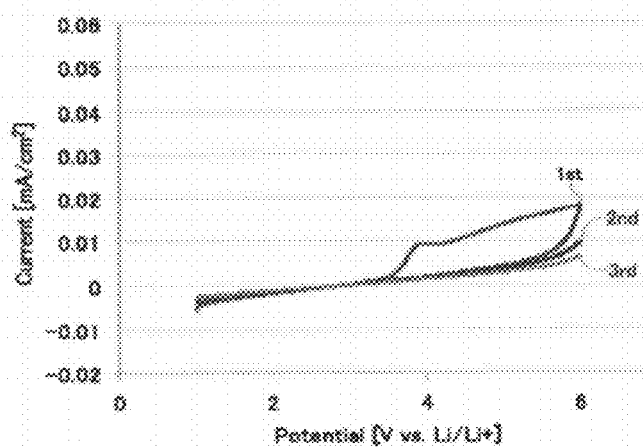
FIG. 7 is a cyclic voltammogram for the case where a commercially available aluminum foil produced by rolling is used as a test electrode.
Figure 8:
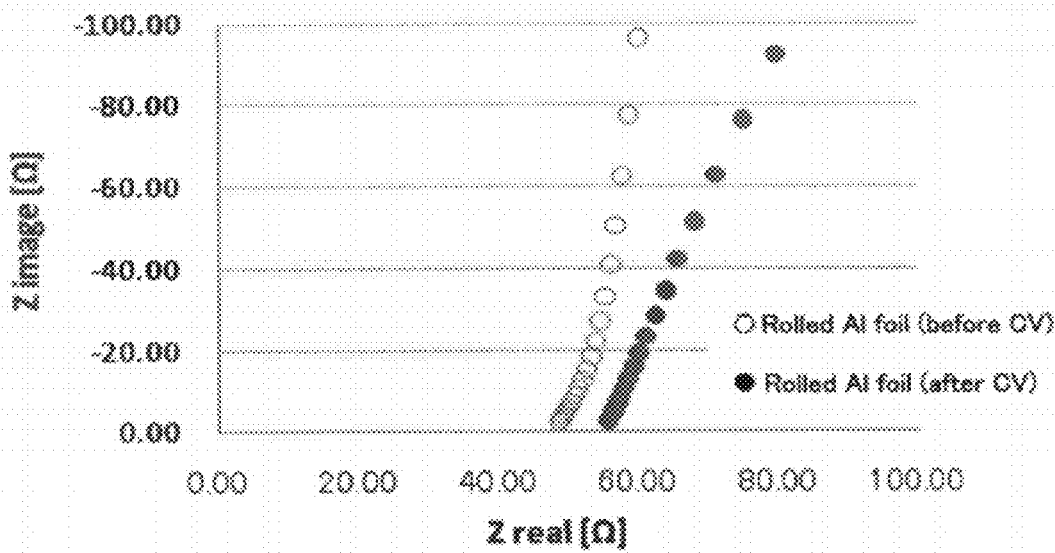
FIG. 8 is a graph showing inter-terminal resistances of a cell before and after performing the cyclic voltammetry.

A pseudo battery cell was fabricated using an aluminum foil with acetylene black particles dispersed and supported therein that had been subjected to a heat treatment as a test electrode, lithium foils as a counter electrode and a reference electrode, and 1M LiPF$_6$/EC+DMC as an electrolytic solution. Using this pseudo battery cell, a cyclic voltammetry was performed in five cycles using an electrochemical measuring device (HZ-5000: manufactured by HOKUTO DENKO CORPORATION) to evaluate electrochemically characteristics thereof. Results are shown in FIG. 5 (in the drawing, behaviors in the fourth cycle and the fifth cycle are omitted). Further, FIG. 6 shows results of measuring inter-terminal resistances of the cell before and after performing the cyclic voltammetry, using an impedance analyzer (Model 1260: manufactured by Solartron) in a range of 100 Hz to 100 kHz (in the drawing, "Composite Al foil (before CV/after CV)"). FIG. 7 shows results of evaluating in the same manner electrochemically characteristics of a commercially available rolled foil as a comparative object (in the drawing, behaviors in the fourth cycle and the fifth cycle are omitted). Further, FIG. 8 shows results of measuring inter-terminal resistances of the cell (in the drawing, "Rolled Al foil (before CV/after CV)"). As is clear from a comparison between FIGS. 5 and 7, in the aluminum foil with acetylene black particles dispersed and supported therein, as is the case for the commercially available rolled foil, in the first cycle, there was observed a behavior of the passive film formation caused by the reaction between the foil and the electrolytic solution, but, in the second and subsequent cycles, an electrochemically stable behavior was shown. Further, as is clear from a comparison between FIGS. 6 and 8, in the aluminum foil with acetylene black particles dispersed and supported therein, the increase in the resistance value was suppressed as compared with the commercially available rolled foil. From the above results, it was found that the aluminum foil with acetylene black particles dispersed and supported therein has a low surface resistance and is useful as a positive electrode current collector in which thickness reduction has been achieved for size reduction and higher energy density of electrical storage devices.

Example 2

The procedure in Example 1 was repeated, except that commercially available carbon nano tubes having a size (diameter) of about 30 nm were used in place of acetylene black particles, to give an aluminum foil with carbon nano tubes dispersed and supported therein having a thickness of 15 μm. The amount of carbon nano tubes dispersed and supported was 0.13 mass %. Similarly to Example 1, the purity of the foil, the effect of the heat treatment and the applicability as a positive electrode current collector for electrical storage devices were evaluated, and the foil showed similar characteristics to the aluminum foil with acetylene black particles dispersed and supported therein obtained in Example 1.

Example 3

The procedure in Example 1 was repeated, except that commercially available carbon nano fibers having a size (fiber diameter) of about 150 nm were used in place of acetylene black particles, to give an aluminum foil with carbon nano fibers dispersed and supported therein having a thickness of 15 μm. The amount of carbon nano fibers dispersed and supported was 0.25 mass %. Similarly to Example 1, the purity of the foil, the effect of the heat treatment and the applicability as a positive electrode current collector for electrical storage devices were evaluated, and the foil showed similar characteristics to the aluminum foil with acetylene black particles dispersed and supported therein obtained in Example 1.

Example 4

The procedure in Example 1 was repeated, except that commercially available carbon black particles having a size (particle diameter) of about 5 μm were used in place of acetylene black particles, to give an aluminum foil with carbon black particles dispersed and supported therein having a thickness of 15 μm. The amount of carbon black particles dispersed and supported was 0.43 mass %. Similarly to Example 1, the purity of the foil, the effect of the heat treatment and the applicability as a positive electrode current collector for electrical storage devices were evaluated, and the foil showed similar characteristics to the aluminum foil with acetylene black particles dispersed and supported therein obtained in Example 1.

Example 5

The procedure in Example 1 was repeated, except that commercially available black lead particles having a size (particle diameter) of about 50 μm were used in place of acetylene black particles and electroplating was performed for 40 minutes, to give an aluminum foil with black lead particles dispersed and supported therein having a thickness of 40 μm. The amount of black lead particles dispersed and supported was 0.82 mass %. Similarly to Example 1, the purity of the foil, the effect of the heat treatment and the applicability as a positive electrode current collector for electrical storage devices were evaluated, and the foil showed similar characteristics to the aluminum foil with acetylene black particles dispersed and supported therein obtained in Example 1.

Example 6

The procedure in Example 1 was repeated, except that commercially available black lead particles having a size (particle diameter) of about 100 μm were used in place of acetylene black particles and electroplating was performed for 80 minutes, to give an aluminum foil with black lead particles dispersed and supported therein having a thickness of 80 μm. The amount of black lead particles dispersed and supported was 1.12 mass %. Similarly to Example 1, the purity of the foil, the effect of the heat treatment and the applicability as a positive electrode current collector for electrical storage devices were evaluated, and the foil showed similar characteristics to the aluminum foil with acetylene black particles dispersed and supported therein obtained in Example 1.

Example 7

The procedure in Example 1 was repeated, except that electroplating was performed at an applied current density of 2 $A/dm^2$ for 25 minutes, to give an aluminum foil with acetylene black particles dispersed and supported therein having a thickness of 10 μm. Except that this aluminum foil with acetylene black particles dispersed and supported therein had a different thickness, it showed similar characteristics to the aluminum foil with acetylene black particles dispersed and supported therein obtained in Example 1.

Example 8

The procedure in Example 1 was repeated, except that electroplating was performed at an applied current density of 3 $A/dm^2$ for 70 minutes, to give an aluminum foil with acetylene black particles dispersed and supported therein having a thickness of 40 μm. Except that this aluminum foil with acetylene black particles dispersed and supported therein had a different thickness, it showed similar characteristics to the aluminum foil with acetylene black particles dispersed and supported therein obtained in Example 1.

Example 9

The procedure in Example 1 was repeated, except that electroplating was performed at an applied current density of 12 $A/dm^2$ and at a stirring rate of 800 rpm for 45 minutes, to give an aluminum foil with acetylene black particles dispersed and supported therein having a thickness of 100 μm. Except that this aluminum foil with acetylene black particles dispersed and supported therein had a different thickness, it showed similar characteristics to the aluminum foil with acetylene black particles dispersed and supported therein obtained in Example 1.

Application Example 1

Production of Electrical Storage Device using Aluminum Foil with Carbonaceous Particles Dispersed and Supported therein as Positive Electrode Current Collector for Electrical Storage Devices Using the aluminum foil with acetylene black particles dispersed and supported therein obtained in Example 1 as a positive electrode current collector, a positive electrode active material was applied to the surface thereof, and the thus-obtained positive electrode was used to produce an electrical storage device with a known configuration.

Reference Example 1

Relation between Amount of Carbonaceous Particles added to Plating Solution and Amount of Carbonaceous Particles Dispersed and Supported in Aluminum Foil with Carbonaceous Particles Dispersed and Supported Therein Using each of plating liquids obtained by adding acetylene black particles in various amounts to a plating solution, and, in a manner similar to that in Example 1, aluminum foils with acetylene black particles dispersed and supported therein having a thickness of 15 μm were obtained. For each of aluminum foils, the amount of acetylene black particles dispersed and supported was measured. Results are shown in FIG. 9. As is clear from FIG. 9, with the increase in the amount of acetylene black particles added to the plating solution, the amount of acetylene black particles dispersed and supported also increased in the aluminum foil with acetylene black particles dispersed and supported therein.

Industrial Applicability

The present invention makes it possible to provide an aluminum foil that can make a positive electrode current collector thinner for size reduction and higher energy density of electrical storage devices, be produced easily and has a low surface resistance. In this respect, the present invention is industrially applicable.

The invention claimed is:

1. A method for producing an aluminum foil with carbonaceous particles dispersed and supported therein, comprising:
   forming an aluminum film with carbonaceous particles dispersed and supported therein on a surface of a substrate by electrolysis using a plating liquid containing carbonaceous particles dispersed therein;
   after completing the electrolysis, removing the film from the substrate to obtain an aluminum foil with carbonaceous particles dispersed and supported therein; and
   subjecting the foil to a heat treatment,
   wherein the plating liquid is obtained by dispersing carbonaceous particles in a plating solution consisting essentially of (1) a dialkyl sulfone, (2) an aluminum halide, and (3) at least one nitrogen-containing compound selected from the group consisting of ammonium halides, hydrogen halide salts of primary amines, hydrogen halide salts of secondary amines, hydrogen halide salts of tertiary amines, and quaternary ammonium salts represented by the general formula: $R^1R^2R^3R^4N.X$ ($R^1$ to $R^4$ independently represent an alkyl group and X represents a counteranion for the quaternary ammonium cation),
   wherein the electrolysis is performed by applying a current density of 2-15 $A/dm^2$ to the plating liquid, and
   wherein the heat treatment is performed by exposure to a heated atmosphere at 80-550° C., and the atmosphere is one of an air atmosphere, a reduced-pressure atmosphere, or an inert gas atmosphere.

2. A production method according to claim 1, wherein the size of the carbonaceous particles is 1 nm to 100 μm.

3. A production method according to claim 1, wherein the amount of the carbonaceous particles dispersed and supported in the aluminum foil with the carbonaceous particles dispersed and supported therein is 0.01 to 3.0 mass % of the aluminum foil with the carbonaceous particles dispersed and supported therein.

4. A production method according to claim 1, wherein the aluminum foil with the carbonaceous particles dispersed and supported therein is used for an electrode.

5. The production method according to claim 1, wherein the heat treatment is performed for 2-120 minutes.

* * * * *